(12) United States Patent
Preciado

(10) Patent No.: US 10,597,891 B2
(45) Date of Patent: Mar. 24, 2020

(54) BLEACHER UMBRELLA CADDY

(71) Applicant: Rudy Preciado, Lenoir City, TN (US)

(72) Inventor: Rudy Preciado, Lenoir City, TN (US)

(*) Notice: Subject to any disclaimer, the term of this patent is extended or adjusted under 35 U.S.C. 154(b) by 0 days.

(21) Appl. No.: 15/673,718

(22) Filed: Aug. 10, 2017

(65) Prior Publication Data
US 2019/0048610 A1 Feb. 14, 2019

(51) Int. Cl.
*E04H 12/22* (2006.01)
*F16M 13/02* (2006.01)

(52) U.S. Cl.
CPC ....... *E04H 12/2269* (2013.01); *F16M 13/022* (2013.01)

(58) Field of Classification Search
CPC ............ A45B 11/00; A45B 2023/0025; A45B 2200/1063; A45B 2200/109
USPC ....... 248/689, 511, 514, 519, 520, 523, 527, 248/534, 535, 538, 541, 229.15, 229.12, 248/229.22, 228.3, 230.3, 231.41, 226.11, 248/231.61, 316.1, 316.4, 316.6, 200
See application file for complete search history.

(56) References Cited

U.S. PATENT DOCUMENTS

| | | | | |
|---|---|---|---|---|
| 278,973 A * | 6/1883 | Kizer | ..................... | A01K 97/10 248/514 |
| 1,755,209 A * | 4/1930 | Danner | .................. | A45C 13/40 135/65 |
| 2,950,836 A * | 8/1960 | Murdock | ............ | A24F 19/0092 131/241 |
| 3,833,196 A * | 9/1974 | Protzman | ............... | F16M 11/10 248/208 |
| 4,141,524 A * | 2/1979 | Corvese, Jr. | ......... | A61G 7/0503 128/DIG. 26 |
| 4,569,579 A * | 2/1986 | Kangas | .................. | F16M 11/16 248/180.1 |
| 4,615,597 A * | 10/1986 | Burriss | .................... | B60R 11/04 248/183.1 |
| 4,932,152 A * | 6/1990 | Barlotta | ................. | A01K 97/10 248/515 |
| 5,055,864 A * | 10/1991 | Slikkers | ................. | F16M 11/14 396/428 |
| 5,088,682 A * | 2/1992 | Gibbs | ................... | B25B 1/2494 248/231.41 |
| 5,260,731 A * | 11/1993 | Baker, Jr. | ................ | B60R 11/04 224/556 |
| 5,368,267 A * | 11/1994 | Howard | ................. | A47G 7/044 248/208 |
| 5,431,364 A * | 7/1995 | Etter | ...................... | A45B 11/00 135/16 |
| 5,836,327 A * | 11/1998 | Davis | .................... | A45B 11/00 135/16 |
| 5,842,671 A * | 12/1998 | Gibbs | ............... | A47G 23/0225 248/231.41 |
| 6,156,026 A * | 12/2000 | Rondeau | .................. | E04H 4/12 239/283 |
| 6,290,192 B1 * | 9/2001 | Messerli | ............ | A61M 5/1415 248/188.5 |

(Continued)

*Primary Examiner* — Terrell L McKinnon
*Assistant Examiner* — Michael McDuffie
(74) *Attorney, Agent, or Firm* — Van R. Irion

(57) ABSTRACT

An umbrella holder holds an umbrella and attaches to sports bleachers. Holder includes a hollow tube for placing an umbrella handle and a threaded rod screwed in the tube for tightening or releasing the umbrella handle. An attaching mechanism is fixed to the hollow tube and includes a means for clamping holder to sports bleachers.

6 Claims, 3 Drawing Sheets

(56) References Cited

U.S. PATENT DOCUMENTS

| | | | | |
|---|---|---|---|---|
| 6,318,691 B1* | 11/2001 | Toth, Jr. | ............... | A45D 20/12 |
| | | | | 248/231.41 |
| 6,378,819 B1* | 4/2002 | Johnson | ............... | B60R 9/06 |
| | | | | 24/525 |
| 6,474,615 B1* | 11/2002 | Simonen | ............... | B60R 11/04 |
| | | | | 248/309.1 |
| 6,533,237 B1* | 3/2003 | Matusek | ............... | A45B 11/00 |
| | | | | 248/291.1 |
| 6,761,465 B2* | 7/2004 | Little | ............... | A47G 7/045 |
| | | | | 248/231.41 |
| 6,926,018 B1* | 8/2005 | Ryo | ............... | A45B 11/02 |
| | | | | 135/15.1 |
| 7,191,990 B2* | 3/2007 | Hutter, III | ............... | B64C 1/406 |
| | | | | 248/228.3 |
| 8,141,839 B2* | 3/2012 | Buchner | ............... | A63B 55/408 |
| | | | | 248/229.15 |
| 8,146,879 B2* | 4/2012 | Liao | ............... | A45B 11/00 |
| | | | | 135/135 |
| 9,088,845 B2* | 7/2015 | Mariano | ............... | H04R 1/08 |
| 9,791,101 B1* | 10/2017 | Frankel | ............... | F16M 13/022 |
| 2008/0185493 A1* | 8/2008 | Wakefield | ............... | A01K 97/06 |
| | | | | 248/512 |
| 2009/0139669 A1* | 6/2009 | Robin | ............... | A45B 11/00 |
| | | | | 160/351 |
| 2011/0260029 A1* | 10/2011 | Kost | ............... | A45B 11/00 |
| | | | | 248/514 |
| 2018/0110335 A1* | 4/2018 | O'Hagan | ............... | A01K 97/22 |
| 2018/0192776 A1* | 7/2018 | Scrone-Smith | ............... | A47C 7/66 |
| 2018/0263394 A1* | 9/2018 | Thomas | ............... | A47G 23/0225 |

\* cited by examiner

BLEACHER UMBRELLA CADDY

This is a Non-Provisional patent application filed for the invention by Rudy Preciado and Renee Preciado of 3807 Town Creek Road West, Lenoir City, Tenn. 37771, for new and useful "Bleacher Umbrella Caddy."

FIELD OF THE INVENTION

The invention relates to an umbrella holder; and more particularly to a portable umbrella holder having features allowing quick, easy, and secure temporary attachment to bleachers and other common outdoor structures.

BACKGROUND OF THE INVENTION

It is often desirable to have an umbrella to provide a welcome shield from the sun or rain. The use of umbrellas during the viewing of various sporting events has been widely practiced during both rain periods as well as sun periods. The umbrella protects the sports fan from the heat of the sun and also protects the fan as well as his personal items from the rain.

However, manually holding an umbrella can prove quite cumbersome. Furthermore, holding an umbrella for an entire sporting event will prove tiring. It would be a benefit, therefore, to have an umbrella holder that could be affixed to the handle of an existing umbrella and could be secured to a fixed object, and be positioned at a desired height to afford a user protection from the weather. It would be further desirable if the umbrella holder were lightweight and securable to a variety of structures, including bleachers commonly found at sporting events.

To solve these problems, umbrella holders have been developed in the art. Such devices relieve the sports fan from manually holding the umbrella by attaching the umbrella to various fixed objects, such as folding chairs, picnic tables, golf bags, ice chests, and similar objects. However, the prior art devices are either too complex to build or use or require a permanent alteration to the object to which it is attached.

Therefore, there is a need in the art for a portable umbrella holder that quickly, easily, and temporarily attaches to a fixed object without modifying or damaging the fixed object.

SUMMARY OF THE INVENTION

The umbrella holder of the present invention addresses the aforementioned needs in the art. The umbrella holder quickly and easily attaches to and detaches from bleachers without the need to modify the bleachers or the umbrella. The umbrella holder is of relatively simple design and construction.

The umbrella holder comprises a tube; a first L-bracket; a second L-bracket; a clamp mechanism; and an umbrella shaft and handle-securing mechanism.

The first and second L-brackets each have a ninety degree bend at their mid-points. The second L-bracket, in the same orientation as the first, attaches to the first L-bracket flush along a first side of both L-brackets. Attachment leaves a gap between a second side of the L-brackets, said second side of the L-brackets are disposed generally parallel to each other. A first clamping mechanism is attached to the first L-bracket at the second side, oriented to clamp objects between the first and second L-brackets. A tube is attached to first and second L-brackets at the first side of said L-brackets, along the flat side of the L-brackets. The tube is oriented such that one end points up when the umbrella holder is attached to a bleacher seat.

In the preferred embodiment the L-brackets consist of steel.

In an alternative embodiment the first L-bracket is shorter on the first side, thereby leaving the top ends of the first and second L-brackets flush with each other.

In the preferred embodiment the umbrella holder includes an umbrella shaft securing mechanism comprising a second clamping mechanism attached to the tube. The second clamping mechanism holds an umbrella handle and shaft after the umbrella handle and shaft are inserted into the tube. The second clamping mechanism also allows the user to raise and lower the umbrella relative to the tube.

In the preferred embodiment the first clamping mechanism is comprised of a first and second screw mechanism threaded through the second side of the first L-bracket. The screw mechanisms are oriented such that one end of the screw mechanisms extends down from the first L-bracket toward the second L-bracket when the screw mechanism is turned, thereby impinging upon the top of a bleachers seat or other structure that has been inserted between the first and second L-brackets. The impingement of the screw mechanism upon the bleachers seat causes the second L-bracket to impinge upon the bottom of the bleachers seat, thereby mechanically securing the umbrella holder to the bleachers seat.

In the preferred embodiment one end of the screw mechanisms include a knob configured to aid in manual turning of the screw mechanisms.

In an alternate embodiment the screw mechanisms are wing screws.

In an alternate embodiment an appropriate non-scuff material such as rubber or neoprene can be secured to the surfaces of the L-brackets and the impinging end of the screw mechanisms in order to prevent damage to the bleachers seat and to increase the coefficient of friction between the umbrella holder and the bleachers seat or other structure.

In the preferred embodiment the second clamping mechanism is a third screw mechanism threaded through the side of the tube. After an umbrella handle or shaft are inserted into the top of the tube, the screw mechanism is turned causing one end of the screw mechanism to extend into the interior of the tube, thereby impinging upon the umbrella handle or shaft. The second clamping mechanism allows the user to adjust the length of the umbrella protruding from the tube, while simultaneously preventing the umbrella from being blown out of the tube.

In an alternate embodiment an appropriate non-scuff material such as rubber or neoprene can be secured to the interior surfaces of the tube and the impinging end of the screw mechanism in order to prevent damage to the umbrella and to increase the coefficient of friction between the umbrella holder and the umbrella.

In another alternate embodiment the first clamping mechanism is attached to the second side of the second L-bracket, thereby having a means of tightening the clamp on the bottom of the device, to impinge upon the bleachers seat from below.

It is thus an objective of the invention to provide an umbrella holder that is securable to the shaft and handle of an existing umbrella that includes a mechanism for securing the umbrella holder to a variety of support structures and that is provided with positioning mechanisms to allow the user to position the umbrella at a desired height.

It is another objective of this invention is to offer an umbrella holder that is quick in its attachment and detachment to a bleachers seat and similar structures, and is thereby convenient in operation.

It is a still further objective of the invention to provide an umbrella holder that includes an umbrella shaft and handle securing mechanism that can be used to secure a variety of umbrella shaft and handle configurations to the umbrella holder.

It is a still further objective of the invention to provide an umbrella holder that accomplishes all or some of the above objects in combination.

It is to be understood that both the foregoing general description and the following detailed description provide embodiments of the invention and are intended to provide an overview or framework of understanding the nature and character of the invention as it is claimed.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

The present invention, which is described more fully hereinafter, provides an umbrella holder that quickly and easily attaches to and detaches from bleachers without the need to modify the bleachers or the umbrella. This invention may be embodied in many different forms and should not be construed as limited to the specific embodiments described herein.

Figure 1:
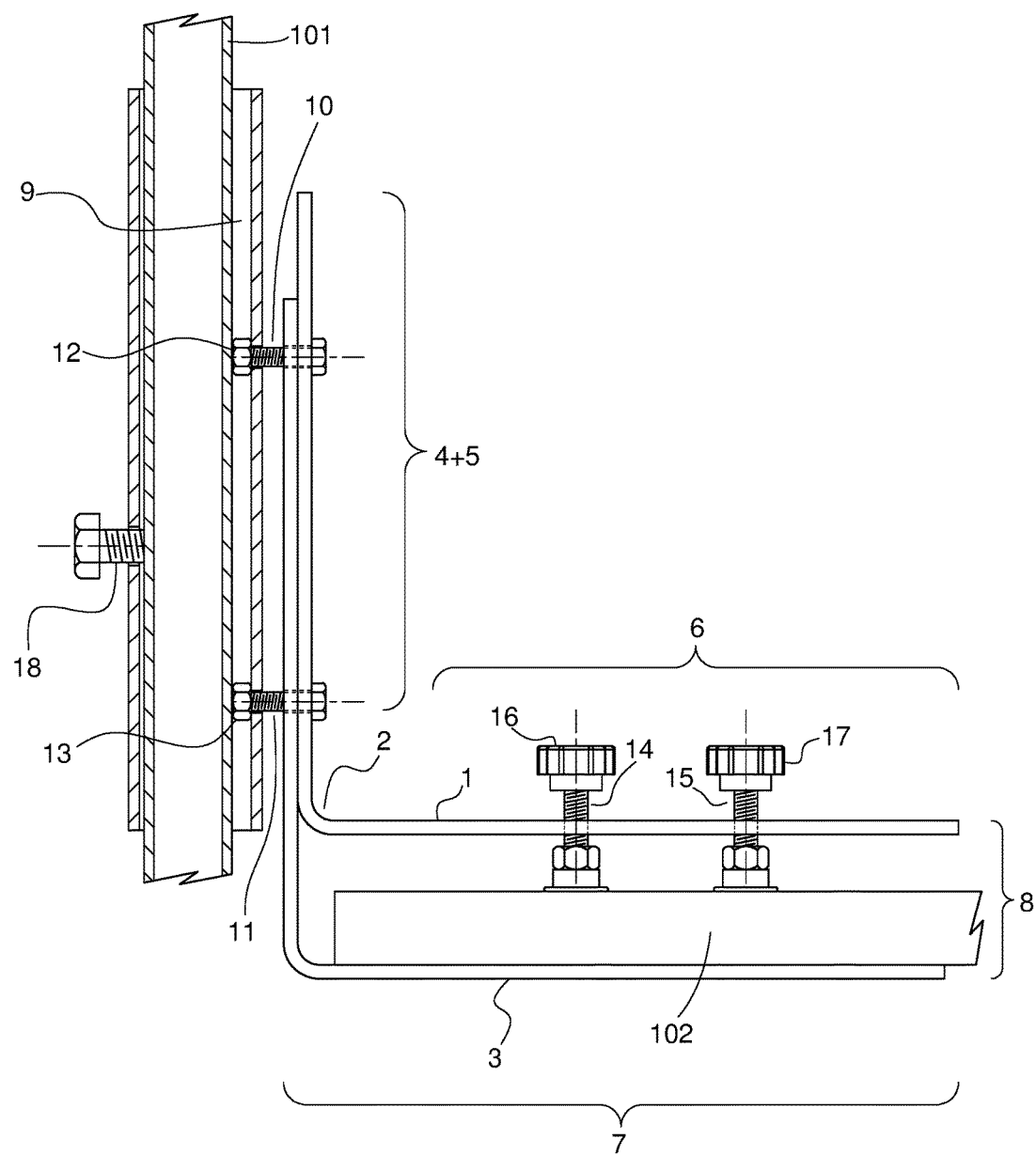
FIG. 1 is a side view with cutaway of the tube of an embodiment of the umbrella holder.

Referring now to FIG. 1 the preferred embodiment of the umbrella holder includes a first L-bracket [1] having a ninety degree bend [2] at its midpoint. A second L-bracket [3] is essentially identical to the first L-bracket [1]. The first and second L-brackets are attached at a first side [4] and [5] of each L-bracket. The L-brackets are in the same orientation to each other and are attached such that the second side [6] of the first L-bracket [1] is separated from the second side [7] of the second L-bracket [3], thereby creating a gap [8]. A tube [9] is attached to the first side [4] of the first L-bracket [1] and the first side [5] of the second L-bracket [3]. The attachment is made via use of a first bolt [10] inserted through the first [1] and second [3] L-brackets and the tube [9], and a second bolt [11] inserted through the first [1] and second [3] L-brackets and the tube [9] at a point below the first bolt [10]. Both bolts are secured with a nut [12],[13]. Two clamping screws [14],[15] are threaded through the second side [4] of the first L-bracket [1]. The clamping screws can be lowered to impinge upon a bleachers seat by turning knobs [16],[17] attached to the clamping screws [14],[15]. A third clamping screw [18] is threaded through the side of the tube [9] to allow securing of an umbrella shaft or handle inside the tube [9].

Figure 2:
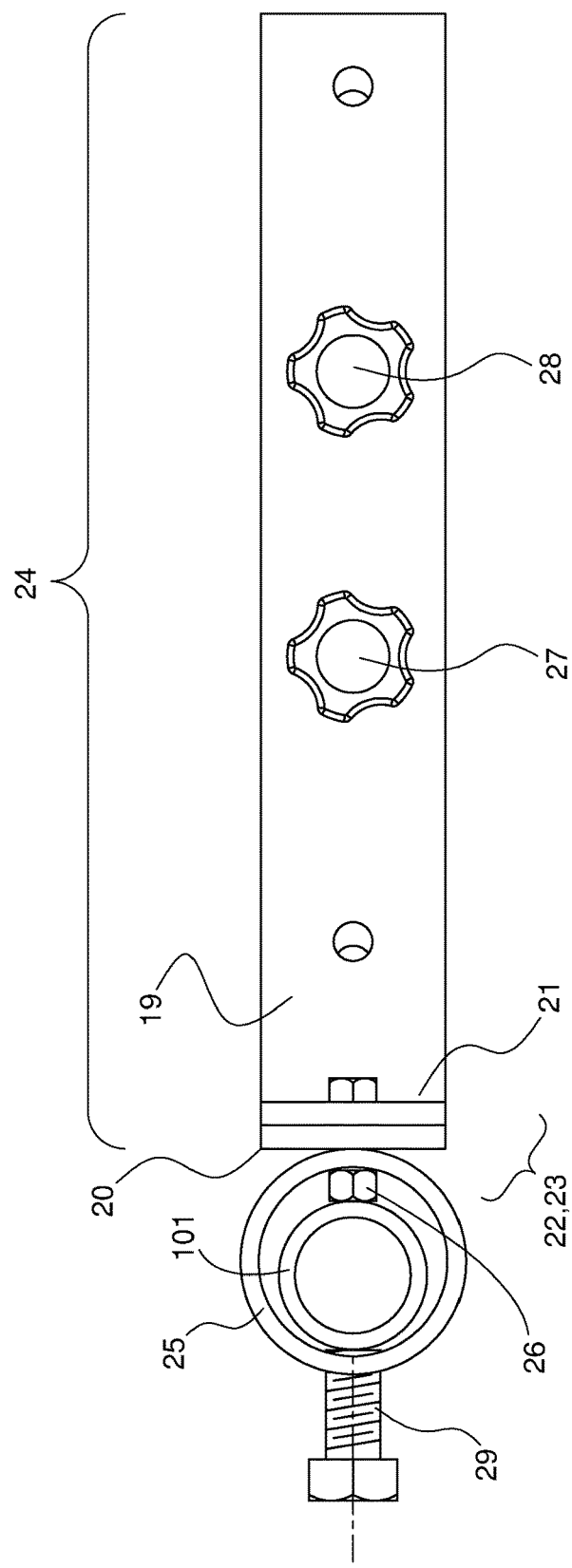
FIG. 2 is a top view of the embodiment disclosed in FIG. 1.

Referring now to FIG. 2, the first L-bracket [19] of FIG. 2 corresponds to the first L-bracket [1] in FIG. 1. The second L-bracket [20] corresponds to the second L-bracket [3] of FIG. 1. The bend [21] corresponds to the bend [2] in FIG. 1. The first side [22] and [23] of each L-bracket [19],[20] corresponds to the first side of each L-bracket [1],[3] in FIG. 1. The second side [24] of the first L-bracket [19] corresponds to the second side [6] of the first L-bracket in FIG. 1. The second side of the second L-bracket, as well as the gap, cannot be seen from the top view. The tube [25] corresponds to the tube [9] in FIG. 1. The first bolt [26] corresponds to the first bolt [10] in FIG. 1. The second bolt cannot be seen from the top view. The nut [26] corresponds with the nut [12] in FIG. 1. In an alternative embodiment the first and second nut and bolt assembly are oriented 180 degrees from the orientation represented in the Figures, thereby reducing protrusion of the bolt into the interior of the tube. The knobs [27],[28] correspond to the knobs [16],[17] in FIG. 1. The third clamping screw [29] corresponds to the third clamping screw [18] in FIG. 1.

Figure 3:
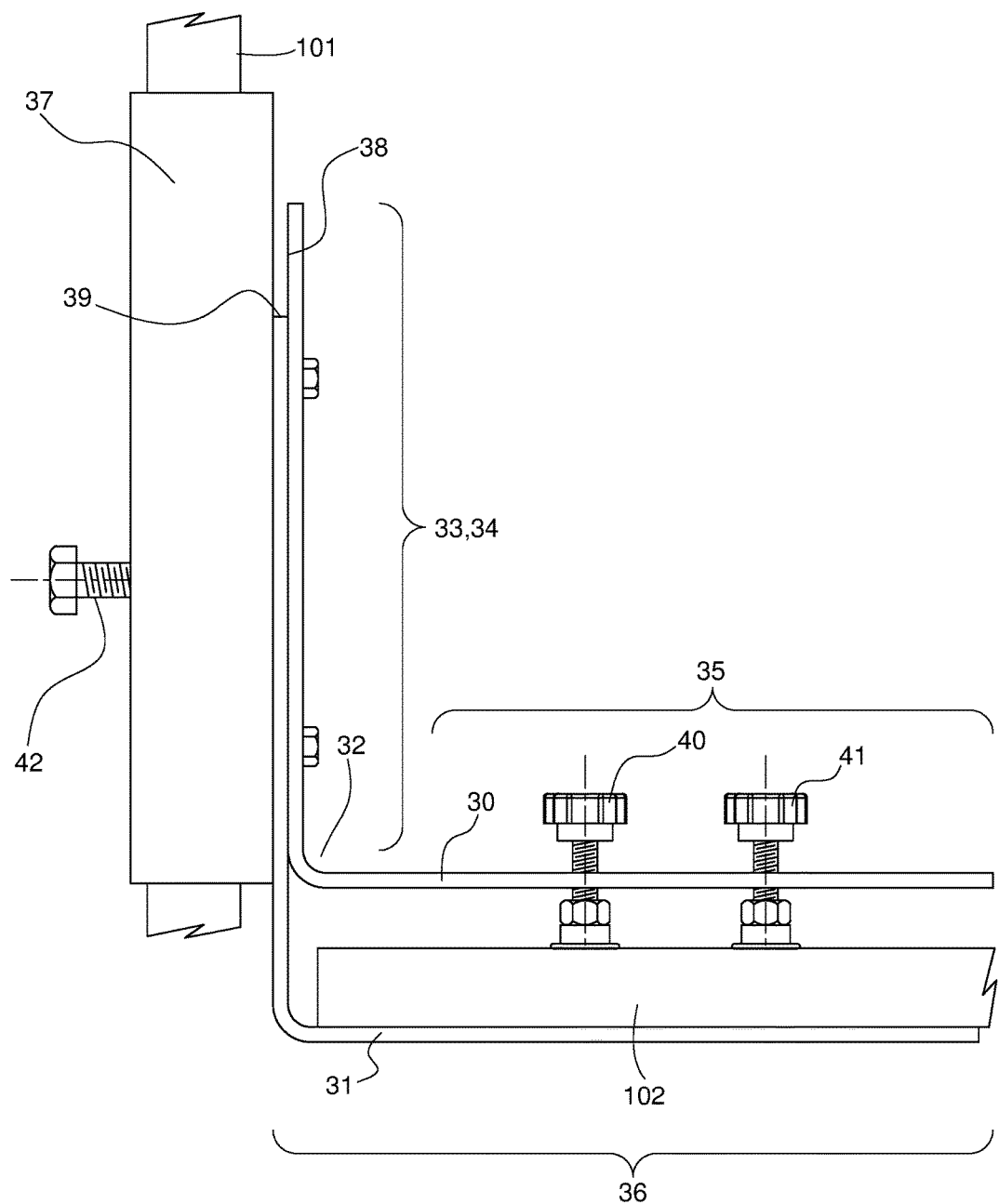
FIG. 3 is a side view of the embodiment disclosed in FIG. 1.

Referring now to FIG. 3, the first L-bracket [30] corresponds to the first L-bracket [1],[19] in FIG. 1 and FIG. 2, respectively. The second L-bracket [31] corresponds to the second L-bracket [3],[20] of FIG. 1 and FIG. 2, respectively. The bend [32] corresponds to the bend [2],[21] in FIG. 1 and FIG. 2, respectively. The first side [33] and [34] of each L-bracket [30],[31] corresponds to the first side of each L-bracket [1],[3],[22],[23] in FIG. 1 and FIG. 2, respectively. The second side [35] of the first L-bracket [30] corresponds to the second side [6],[24] of the first L-bracket [30] in FIG. 1 and FIG. 2, respectively. The second side [36] of the second L-bracket [31] corresponds to the second side [7] of the second L-bracket [31] in FIG. 1 The tube [37] corresponds to the tube [9],[25] in FIG. 1 and FIG. 2, respectively. The first bolt [38] corresponds to the first bolt [10],[26] in FIG. 1 and FIG. 2, respectively. The nut [39] corresponds with the nut [12] in FIG. 1. The knobs [40],[41] correspond to the knobs [16],[17] in FIG. 1 and [27],[28] in FIG. 2. The third clamping screw [42] corresponds to the third clamping screw [18],[29] in FIG. 1 and FIG. 2, respectively.

EXAMPLE

The invention is further described by the following non-limiting example of use.

The user slides the umbrella holder over the bleachers seat such that the gap of the umbrella holder is filled by the bleachers seat, leaving the bleachers seat between the second side of the first L-bracket and the second side of the second L-bracket. The user then engages the first clamping mechanism by turning the knobs on the first and second screwing mechanism. This causes one end of the screwing mechanism to impinge upon the top of the bleachers seat, causing the second side of the second L-bracket to rise and impinge upon the bottom of the bleachers seat. The user then inserts an umbrella handle or shaft into the tube. The user then secures the umbrella handle or shaft by turning the third knob causing the second clamping mechanism to impinge upon the umbrella shaft within the tube.

What is claimed is:

1. An umbrella holder attached to a bleacher seat, consisting of A first L-bracket, said L-bracket having a ninety degree bend at the mid-point, said L-bracket further having a first side and a second side, a second L-bracket, said L-bracket having a ninety degree bend at the mid-point, said L-bracket further having a first side and a second side; said second L-bracket in the same orientation as the first L-bracket, said first side of said second L-bracket affixed to said first side of said first L-bracket; a gap between said second side of said first L-bracket and said second side of said second L-bracket, said gap being the space between second side of said first and second L-brackets which are disposed generally parallel to each other; a first clamping mechanism affixed to the first L-bracket at the second side, oriented to clamp objects between the first and second L-brackets, said first damping mechanism consisting of a first screw mechanism and second screw mechanism, said screw mechanisms threaded through the first side of the first L-bracket, said screw mechanisms oriented such that one end of said screw mechanisms extend down from the first L-bracket toward the second L-bracket when the screw mechanism is turned, thereby impinging upon the top of a bleacher seat, said bleacher seat having been inserted into said gap, said second side of said first L-bracket and said second side of said second L-bracket oriented horizontally above and below said bleachers seat; a tube affixed to said first L-bracket and said second L-bracket at said first side of said L-brackets, said tube oriented such that one end points up when said umbrella holder is attached to said bleacher seat; a mechanism for securing an umbrella shaft, comprising a second clamping mechanism attached to said tube, said second clamping mechanism consisting of a third screw mechanism, said screw mechanism threaded through the side of said tube, oriented such that one end of said screw mechanism extends into the interior of said tube toward an umbrella shaft when the screw mechanism is turned, thereby impinging upon the side of said umbrella shaft and securing said umbrella shaft against an interior side of said tube; a first non-scuff material secured to a first surface of said second side of said first L-bracket; a second non-scuff material secured to a second surface of said second side of said second L-bracket; a third non-scuff material secured to said first screw mechanism; a fourth non-scuff material secured to said second screw mechanism; a fifth non-scuff material secured to said third first screw mechanism; and a sixth non-scuff material secured to interior of said tube.

2. The umbrella holder of claim 1 wherein said non-scuff material is rubber.

3. The umbrella holder of claim 1 wherein said non-scuff material is neoprene.

4. A umbrella holder attached to a bleacher seat, comprising: A first L-bracket, said L-bracket having a ninety degree bend at the mid-point, said L-bracket further having a first side and a second side, a second L-bracket, said L-bracket having a ninety degree bend at the mid-point, said L-bracket further having a first side and a second side; said second L-bracket in the same orientation as the first L-bracket, said first side of said second L-bracket affixed to said first side of said first L-bracket; a gap between said second side of said first L-bracket and said second side of said second L-bracket, said gap being the space between second side of said first and second L-brackets which are disposed generally parallel to each other; a first clamping mechanism affixed to the first L-bracket at the second side, oriented to damp objects between the first and second L-brackets, said first damping mechanism consisting of a first screw mechanism and second screw mechanism, said screw mechanisms threaded through the first side of the first L-bracket, said screw mechanisms oriented such that one end of said screw mechanisms extend down from the first L-bracket toward the second L-bracket when the screw mechanism is turned, thereby impinging upon the top of a bleachers seat said bleachers seat having been inserted into said gap, said second side of said first L-bracket and said second side of said second L-bracket oriented horizontally above and below said bleachers seat; a tube affixed to said first L-bracket and said second L-bracket at said first side of said L-brackets, said tube oriented such that one end points up when said umbrella holder is attached to said bleacher seat; a mechanism for securing an umbrella shaft, comprising a second clamping mechanism attached to said tube, said second clamping mechanism consisting of a third screw mechanism, said screw mechanism threaded through the side of said tube, oriented such that one end of said screw mechanism extends into the interior of said tube toward an umbrella shaft when the screw mechanism is turned, thereby impinging upon the side of said umbrella shaft and securing said umbrella shaft against an interior side of said tube; a first non-scuff material secured to a first surface of said second side of said second L-bracket; a second non-scuff material secured to a second surface of said second side of said second L-bracket; a third non-scuff material secured to said first screw mechanism; a fourth non-scuff material secured to said second screw mechanism; a fifth non-scuff material secured to said third first screw mechanism; and a sixth non-scuff material secured to interior of said tube.

5. The umbrella holder of claim 4 wherein said non-scuff material is rubber.

6. The umbrella holder of claim 4 wherein said non-scuff material is neoprene.

* * * * *